United States Patent
Howard et al.

(10) Patent No.: US 7,153,023 B2
(45) Date of Patent: Dec. 26, 2006

(54) METHODS AND APPARATUS FOR INSTALLING PROCESS INSTRUMENT PROBES

(75) Inventors: David Clarence Howard, Cincinnati, OH (US); Eskedar Abebe, Cincinnati, OH (US); Barton Hunter Snow, Wyoming, OH (US)

(73) Assignee: General Electric Company, Schenectady, NY (US)

( * ) Notice: Subject to any disclaimer, the term of this patent is extended or adjusted under 35 U.S.C. 154(b) by 16 days.

(21) Appl. No.: 10/755,771

(22) Filed: Jan. 12, 2004

(65) Prior Publication Data

US 2005/0152433 A1 Jul. 14, 2005

(51) Int. Cl.
*G01K 1/08* (2006.01)
(52) U.S. Cl. .................. 374/144; 374/208; 374/148; 277/606
(58) Field of Classification Search ............... 374/148, 374/147, 208, 144; 73/866.5; 60/803; 415/118, 415/201; 277/436, 438, 910, 603, 609, 606, 277/608
See application file for complete search history.

(56) References Cited

U.S. PATENT DOCUMENTS

| | | | |
|---|---|---|---|
| 2,756,596 A * | 7/1956 | Nelson et al. ............... | 374/144 |
| 2,838,935 A * | 6/1958 | Di Cecio et al. ............ | 374/208 |
| 3,167,733 A * | 1/1965 | Di Noia ...................... | 374/148 |
| 3,348,414 A | 10/1967 | Jackson et al. | |
| 3,362,160 A * | 1/1968 | Bourgeois .................... | 415/118 |
| 3,788,143 A | 1/1974 | Gabriel | |
| 4,132,114 A * | 1/1979 | Shah et al. .................. | 374/144 |
| 4,243,968 A | 1/1981 | Scott | |
| 4,300,774 A * | 11/1981 | Hollis et al. ................. | 60/805 |
| 4,499,330 A | 2/1985 | Pustell | |
| 4,815,276 A * | 3/1989 | Hansel et al. ............... | 415/118 |
| 4,948,264 A * | 8/1990 | Hook, Jr. .................... | 374/144 |
| 5,115,636 A * | 5/1992 | Zeiser ........................ | 415/118 |
| 5,185,996 A * | 2/1993 | Smith et al. ................ | 415/118 |
| 5,366,290 A * | 11/1994 | Mayer et al. ............... | 374/144 |
| 5,431,534 A * | 7/1995 | Charbonnel ................. | 415/118 |
| 5,613,549 A | 3/1997 | Dolwani | |
| 5,662,418 A * | 9/1997 | Deak et al. ................. | 374/144 |
| 5,695,285 A | 12/1997 | Kuberka et al. | |
| 5,844,135 A | 12/1998 | Brammer et al. | |
| 6,389,815 B1 | 5/2002 | Hura et al. | |
| 6,390,673 B1 * | 5/2002 | Camburn ..................... | 374/179 |
| 6,431,824 B1 * | 8/2002 | Schotsch et al. ............ | 415/115 |
| 6,438,940 B1 | 8/2002 | Vacek et al. | |
| 6,578,849 B1 | 6/2003 | Haje | |

FOREIGN PATENT DOCUMENTS

GB  2 076 535 A  12/1981

\* cited by examiner

*Primary Examiner*—Diego Gutierrez
*Assistant Examiner*—Mirellys Jagan
(74) *Attorney, Agent, or Firm*—William Scott Andes; Armstrong Teasdale LLP.

(57) ABSTRACT

A method of mounting an instrument probe using an adapter post is provided. The method includes coupling an attachment end of the adapter post to a first wall defined between a cavity and an annulus, coupling an opposite sealing end of the adapter post to a second wall defined between the annulus and the ambient area, sealing the adapter post to compensate for a relative movement between the first wall and the second wall such that the sealing is maintained, and inserting the instrument probe at least partially within the adapter post to monitor a process parameter within the cavity.

19 Claims, 4 Drawing Sheets

METHODS AND APPARATUS FOR INSTALLING PROCESS INSTRUMENT PROBES

STATEMENT REGARDING FEDERALLY SPONSORED RESEARCH & DEVELOPMENT

The government may have rights in this invention pursuant to government contract number N00019-96-C-0176.

BACKGROUND OF THE INVENTION

This invention relates generally to instrument probe assemblies, and more particularly to sealing instrument probe assemblies from leakage.

At least some known turbine engines include a compressor for compressing air which is suitably mixed with a fuel and channeled to a combustor wherein the mixture is ignited within a combustion chamber for generating hot combustion gases. A portion of the compressor discharge air is directed to a cavity surrounding the combustor for cooling the combustor liner. An operating temperature of the compressor discharge air is at least partially determinative of a rating and power capability of the engine. Accordingly, within at least some known engines the compressor discharge air temperature is monitored with a temperature probe.

At least some known temperature probes include a probe sensor that is inserted into position within the discharge air flow path from outside the engine casing. The probe sensor may extend through a plurality of walls to reach a predetermined position wherein the probe sensor is exposed to the compressor discharge air. For example, in at least some engines, the probe sensor may extend through a fan duct and a wall of the outer flow channel cavity of the engine. Although, the penetrations through the walls that allow installation between the temperature probe may be sealed to prevent leakage, differential thermal expansion of the walls may result in relative movement between the walls, thus causing the seals to leak. Leakage of relatively higher energy air from the outer flow channel cavity of the engine to the fan duct annulus and to an ambient area, and from the fan duct annulus to the ambient area may affect engine performance and engine component life.

BRIEF DESCRIPTION OF THE INVENTION

In one aspect, a method of mounting an instrument probe is provided. The method includes coupling an attachment end of the adapter post to a first wall defined between a cavity and an annulus, coupling an opposite sealing end of the adapter post to a second wall defined between the annulus and the ambient area, sealing the adapter post to compensate for a relative movement between the first wall and the second wall such that the sealing is maintained, and inserting the instrument probe at least partially within the adapter post to monitor a process parameter within the cavity.

In another aspect, a mounting assembly for mounting an instrument probe within a cavity is provided. The mounting assembly includes an instrument probe includes a probe head coupled to a probe sensor, an adapter post including an attachment end, a sealing end, and a hollow body extending therebetween, the body is configured to receive the probe sensor at least partially therein, and a seal plate including an aperture sized to receive the adapter post therethrough.

DETAILED DESCRIPTION OF THE INVENTION

Figure 1:
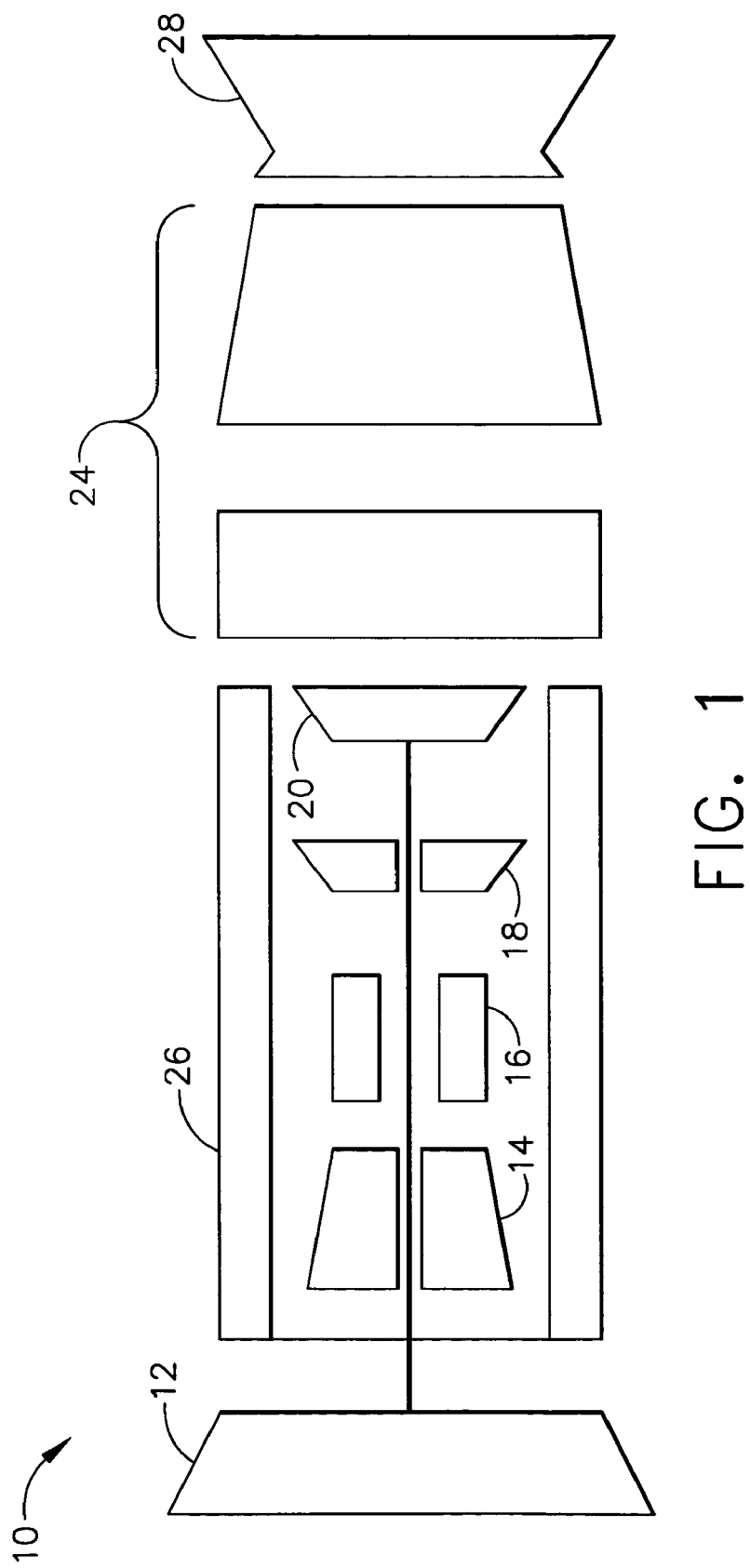
FIG. 1 is a schematic of a gas turbine engine.

FIG. 1 is a schematic illustration of a gas turbine engine 10 including a low pressure compressor 12, a high pressure compressor 14, and a combustor 16. Engine 10 also includes a high pressure turbine 18, a low pressure turbine 20, and an augmenter 24.

In operation, air flows through low pressure compressor 12 and compressed air is supplied from low pressure compressor 12 to high pressure compressor 14. Highly compressed air is then delivered to combustor 16 and airflow from combustor 16 drives turbines 18 and 20. Airflow enters augmenter 24 from turbine 20 and from a bypass duct 26. Augmenter 24 re-ignites the airflow with at least one igniter (not shown in FIG. 1) and the airflow exits gas turbine engine 10 through a nozzle 28.

Figure 2:
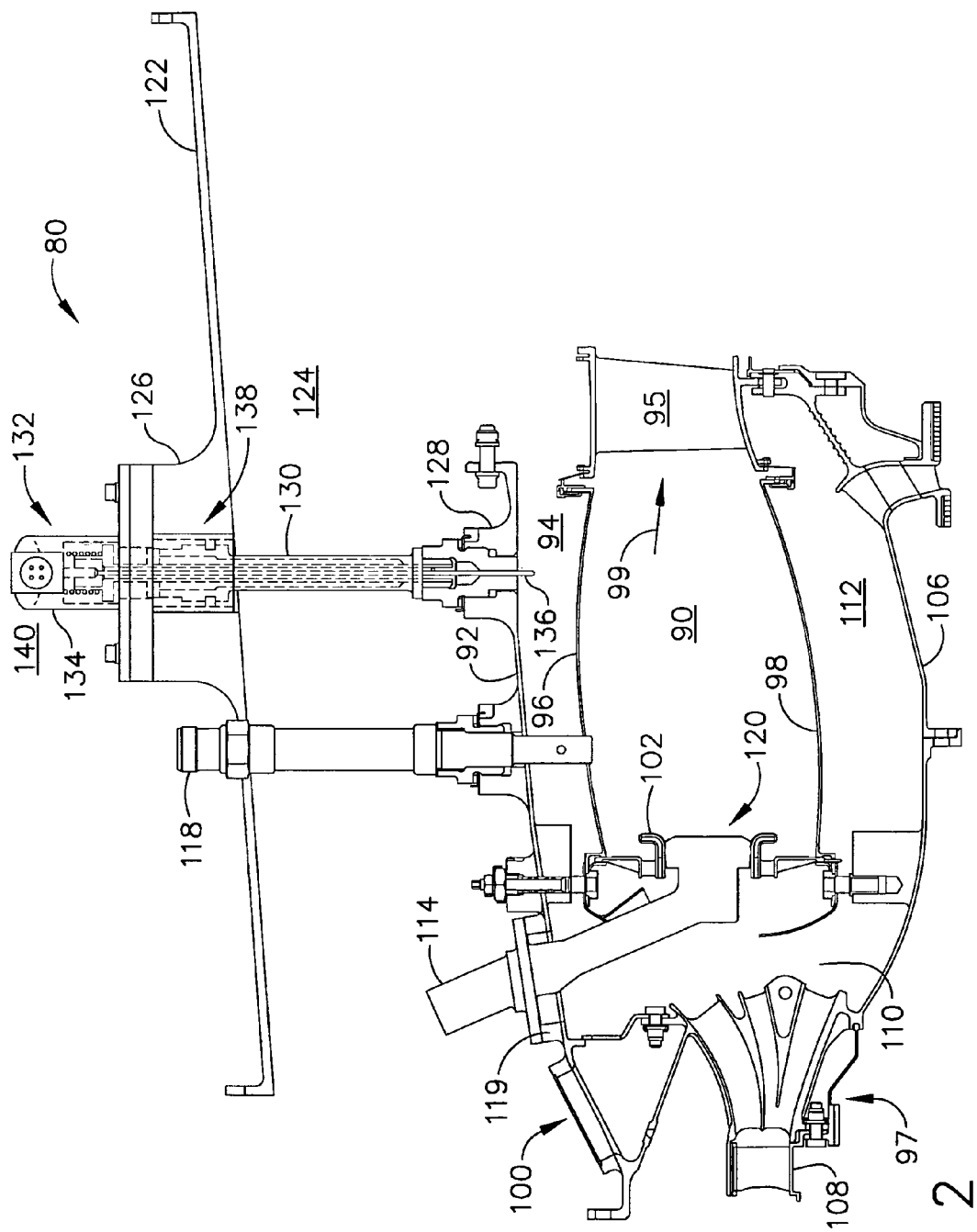
FIG. 2 is a cross-sectional view of an exemplary gas turbine engine combustor that may be used with the engine shown in FIG. 1 and includes an instrument probe mounting assembly for removably coupling an instrument probe to the engine.

FIG. 2 is a cross-sectional view of an exemplary gas turbine engine combustor, such as combustor 16, that may be used with engine 10 (shown in FIG. 1) and includes an instrument probe mounting assembly for removably coupling an instrument probe to the engine. An annular combustion chamber 90 is defined within an annular combustor outer casing 92. Combustor outer casing 92 is spaced radially outward from chamber 90 and defines an outer surface of an combustor flow channel 94 for compressor discharge air to pass therethrough for cooling purposes. Combustion chamber 90 includes an annular combustor outer liner 96 and an annular combustor inner liner 98, and extends axially downstream 99 to a high pressure turbine nozzle 95. An upstream end 97 of combustion chamber 90 includes an annular dome 100 that includes a plurality of air entry holes to admit compressor discharge air. A cross-sectional area of combustion chamber 90 diminishes in the downstream direction 99 to correspond to a cross sectional area of high pressure turbine nozzle 95.

An annular inner casing 106 is positioned radially inwardly of inner liner 98 to confine air from the compressor discharge to pass along the outer surface of combustor inner liner 98, and also to facilitate shielding other engine internal components, such as the engine drive shaft (not shown), from heat generated within combustion chamber 90. In the exemplary embodiment, compressor discharge air flows to combustion chamber 90 through an annular duct 108 that discharges into an enlarged cross-sectional area diffuser section 110 that is immediately upstream of combustion chamber 90. Diffuser section 110 is in flow communication with outer flow channel 94, with an inner flow channel 112, and with fuel nozzle assembly 102. A portion of compressor discharge air enters combustion chamber 90 through and around fuel nozzle assembly 102 while the remaining compressor discharge air flows through outer flow channel 94 and through inner flow channel 112 around combustion chamber 90 to facilitate cooling chamber 94.

Fuel nozzle assembly 102 is in flow communication with a fuel source through a fuel inlet 114. Nozzle assembly 102 is supported by an engine outer casing 92 and is rigidly coupled thereto, such as by bolts or other fasteners. An igniter 118 is positioned downstream of a fuel nozzle holder 119 and extends through outer casing 92 and into combustion chamber 90 to provide initial ignition of the fuel-air mixture within combustion chamber 90. Fuel nozzle assembly 102 provides a central, primary combustion region 120 into which fuel is injected.

An annular fan casing 122 is positioned radially outwardly from engine outer casing 92 and defines a fan duct 124 that facilitates confining air from a fan discharge to be directed along engine outer casing 92. Annular fan casing 122 includes a radially outwardly extending boss 126 that is positioned radially outward from, and is substantially co-aligned with, a boss 128 extending from engine outer casing 92. Boss 128 is configured to receive an adapter post 130. Moreover, adapter post 130 and boss 126 are substantially axially co-aligned to receive an instrument probe 132 therethrough. In the exemplary embodiment, instrument probe 132 is a temperature probe. In alternative embodiments, instrument probe 132 may be, but is not limited to, a pressure probe, and/or a flow probe.

Instrument probe 132 includes a probe head 134 and a sensor 136. Probe head 134 is removably coupled to a radially outer portion of boss 126, and sensor 136 is at least partially inserted into adapter post 130. A sealing arrangement 138 between probe 132, boss 126, adapter post 130, and boss 128, as described in detail below, facilitates maintaining a pressure barrier between outer flow channel 94, fan duct 124, and an ambient area 140. In the exemplary embodiment, ambient area 140 is an area radially outward from fan casing 122, which may be, for example, open to atmosphere, a building environment, and/or an enclosure surrounding fan casing 122.

During operation, power level changes of engine 10 may result in temperature and pressure changes of gases within outer flow channel 94, and fan duct 124. Combustion chamber 90 is subject to relatively rapid changes in temperature with each change in engine power level due to the rapid changes in combustion rates. Heat transferred from hot combustion gases in combustion chamber 90 to combustor outer liner 96 result in combustor outer liner 96 expanding and contracting in response to the temperature changes. Engine outer casing 92 and fan casing 122 are also subject to expansion and contraction in response to temperature changes of these components resulting from engine power level changes. Each of combustor outer liner 96, engine outer casing 92, and fan casing 122 move relative to each other due in part to differing thermal expansion and contraction responses during engine power level changes. Specifically, boss 128 on engine outer casing 92 may move axially, radially and/or circumferentially with respect to boss 126 on fan casing 122 as a result of engine power level changes. Sealing arrangement 138 absorbs relative movement between boss 126 and boss 128 such that a pressure seal between outer flow channel 94, fan duct 124, and ambient area 140 is facilitated being maintained. A pressure within fan duct 124 may be approximately 200 psi above ambient area 140. A pressure of outer flow channel 94 may be approximately 1000 psi above the pressure within fan duct 124. Accordingly, sealing arrangement 138 facilitates preventing gas leakage from outer flow channel 94 to fan duct 124, from outer flow channel 94 to ambient area 140, and from fan duct 124 to ambient area 140.

Figure 3:
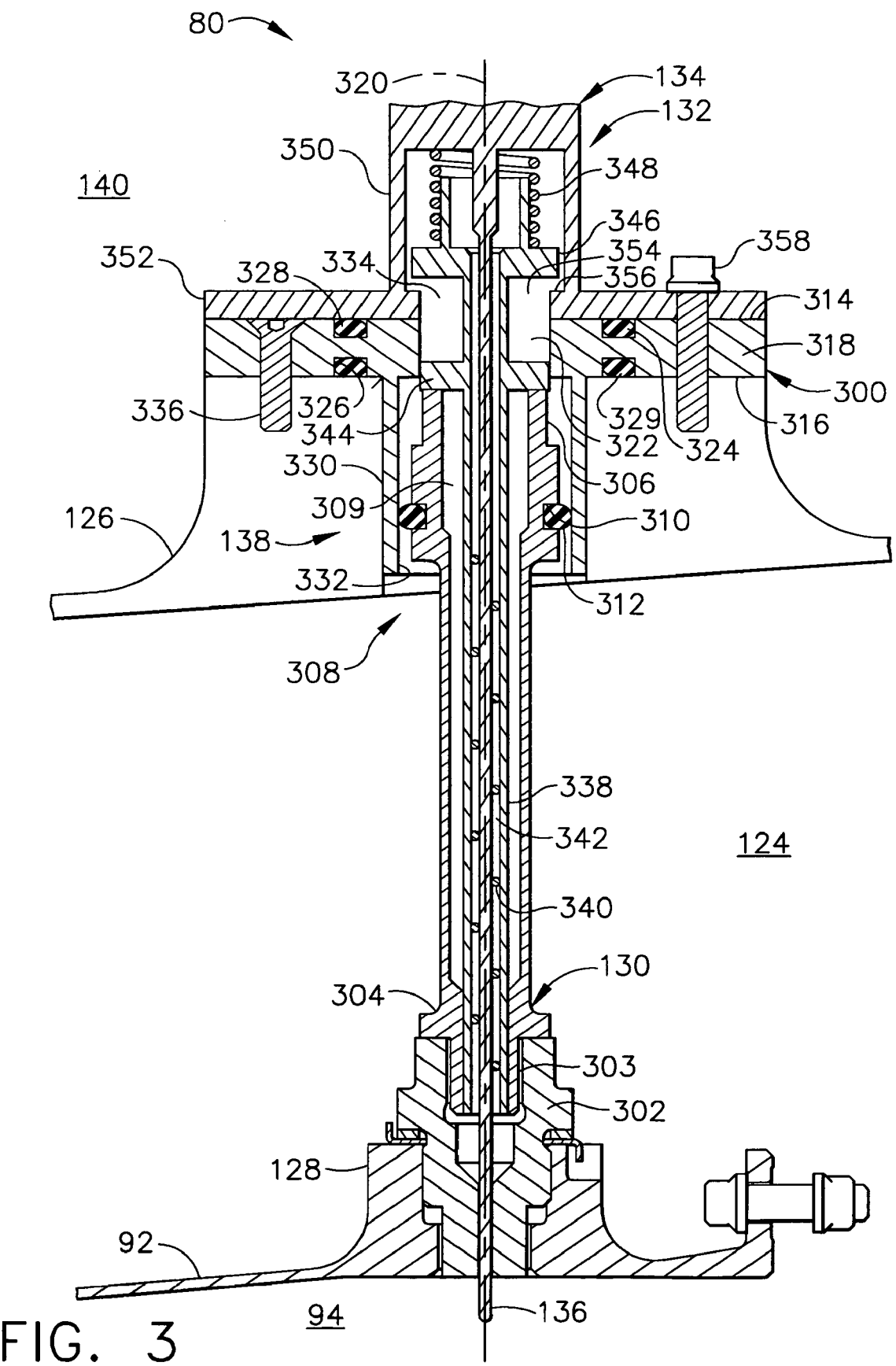
FIG. 3 is an enlarged cross-sectional view of a portion of the instrument probe mounting assembly shown in FIG. 2.

FIG. 3 is a detailed cross-sectional view of an exemplary embodiment of instrument probe mounting assembly 80 (shown in FIG. 2). Instrument probe mounting assembly 80 includes adapter post 130, instrument probe 132, a seal-ring adapter plate 300 and a boss seal 302. In the exemplary embodiment, boss seal 302 is configured to threadably coupled to boss 128, and includes a central aperture 303 therethrough. Adapter post 130 includes an attachment end 304, a wrench flat portion 306, a sealing end 308, and a central bore therethrough 309. Attachment end 304 of adapter post 130 is configured to threadably coupled to boss seal 302. Wrench flat portion 306 is configured to receive a wrench, such as, a torque wrench that may be used to facilitate threadably coupling adapter post 130 to boss seal 302. A circumferential seal ring groove 310 is formed in sealing end 308 axially inward from wrench flat portion 306. Circumferential seal ring groove 310 is sized to receive a piston-ring type seal 312 therein, such that at least a portion of seal 312 extends past an outer diametric periphery from sealing end 308. Seal-ring adapter plate 300 includes a first face 314, an opposing second face 316, and a body 318 extending therebetween. Body 318 includes a central aperture 322 therethrough that is substantially aligned with a longitudinal axis 320. A circumferential groove 322 in face 314 circumscribes central aperture 322 and a similar circumferential groove 326 in face 316 also circumscribes central aperture 322. Grooves 324 and 326 are each configured to receive a compression-type ring seal 328 and 329 respectively, only partially therein. Body 318 also includes a cylindrical wall 330 that extends away from face 316 and circumscribes central aperture 322 between circumferential groove 326 and central aperture 322. A radially inner surface 332 of cylindrical wall 330 is sized to predetermined inside diameter (ID) such that seal 312 and surface 332 cooperate to maintain an axially slidable pressure barrier between fan duct 124 and an interior 334 of probe head 134. Seal-ring adapter plate 300 may be coupled to boss 126 using a plurality of seal-ring adapter plate fasteners 336 (only one shown in FIG. 3), such as, for example, countersunk flat head screws.

Instrument probe 132 includes sensor 136 extending axially away from probe head 134. Probe head 134 includes connecting cabling, front-end electronics and termination points (not shown) to support transmission of process signals generated by sensor 136 to a user's control and/or instrumentation system (not shown). Sensor 136 is co-axially aligned with a radially outer protective sheath 338 that extends axially along at least a portion of sensor 136. In the exemplary embodiment, a helical coil damper wire 340 is coupled to an outer periphery of sensor 136 such that a radial clearance gap 342 between sensor 136 and protective sheath 338 is bridged by helical coil damper wire 340 to facilitate damping vibration of sensor 136. In an alternative embodiment, a plurality of spacers are coupled to an outer periphery of sensor 136 to bridge clearance gap 342. Protective sheath 338 includes an alignment stop 344 and a spring guide 346 that cooperate to maintain sensor 136 and protective sheath 338 attached to probe head 134 when instrument probe 132 is in an "on-the-shelf" condition and facilitates maintaining contact between mating surfaces during all temperature conditions. Spring guide 346 includes a cylindrical wall extending towards probe head 134. A thermal loading spring 348 engages spring guide 346 to apply a radially inward bias to protective sheath 338. Probe head 134 includes a cylindrical cap 350 extending from a mating plate 352 that is configured to be coupled with face 314 and includes a central aperture 354 substantially co-aligned with central aperture 322. Mating plate 352 includes a circumferential shoulder 356 that extends inwardly between cap 350 and central aperture 354. Mating plate 352 is configured to be securely coupled to face 314 using a plurality of fasteners 358 (only one shown in FIG. 3).

During installation, boss seal 302 is threadably coupled to boss 128, and adapter post 130 is threadably coupled to boss seal 302. Wrench flats 306 may be used to apply a torque wrench to torque adapter post 130 to a predetermined torque specification value. Seal 312 may be pre-installed in groove 310 to facilitate installation. Seal-ring adapter plate 300 may be aligned with adapter post 130 and boss 126, and positioned such that surface 322 engages seal 312 and seal 329 engages boss 126. Fasteners 336 are used to couple seal-ring adapter plate 300 to boss 126. Surface 322 and seal 312 are engaged to form a radially slidable pressure seal between fan duct 124 and probe head interior 334. Seal 329 and boss 126 are engaged to form a pressure seal between fan duct 124 and ambient area 140. Instrument probe 132 may be aligned with bore 309 and inserted therein. Alignment stop 344 is configured to engage wrench flat portion 306 and at least partially compress thermal loading spring 348 when mating plate 352 is fully engaged to face 314. Fasteners 358 may be used to securely couple instrument probe to seal-ring adapter plate 300 and to compress seal 328.

In operation, the threaded engagement between boss 128 and boss seal 302, and between boss seal 302 and adapter post 130 facilitates sealing between outer flow channel 94 and fan duct 124. The relatively rigid threaded engagements also force adapter post 130 to move with boss 128 during periods of thermal expansion of engine outer casing 92. Seal-ring adapter plate 300 and instrument probe 132 are relatively rigidly coupled to boss 126, which moves with fan casing 122 during periods of thermal expansion of fan casing 122. Engine outer casing 92 and fan casing 122 may move relative to each other due to each having a different coefficient of thermal expansion associated with each, and due to each changing temperature at different rates relative to each other. Such relative motion may be absorbed by surface 332 and seal 312 while maintaining sealing between fan duct 124 and probe head interior 334. Seal 312 is configured to slide along surface 332 during periods of radial differential movement between adapter post 130 and seal-ring adapter plate 300. Thermal loading spring 348 facilitates maintaining sensor 136 seated within adapter post 130 during all periods of differential movement between adapter post 130 and seal-ring adapter plate 300. Seal 312 is also configured to maintain a pressure barrier seal during periods of axial and circumferential relative movement between adapter post 130 and seal-ring adapter plate 300.

Figure 4:
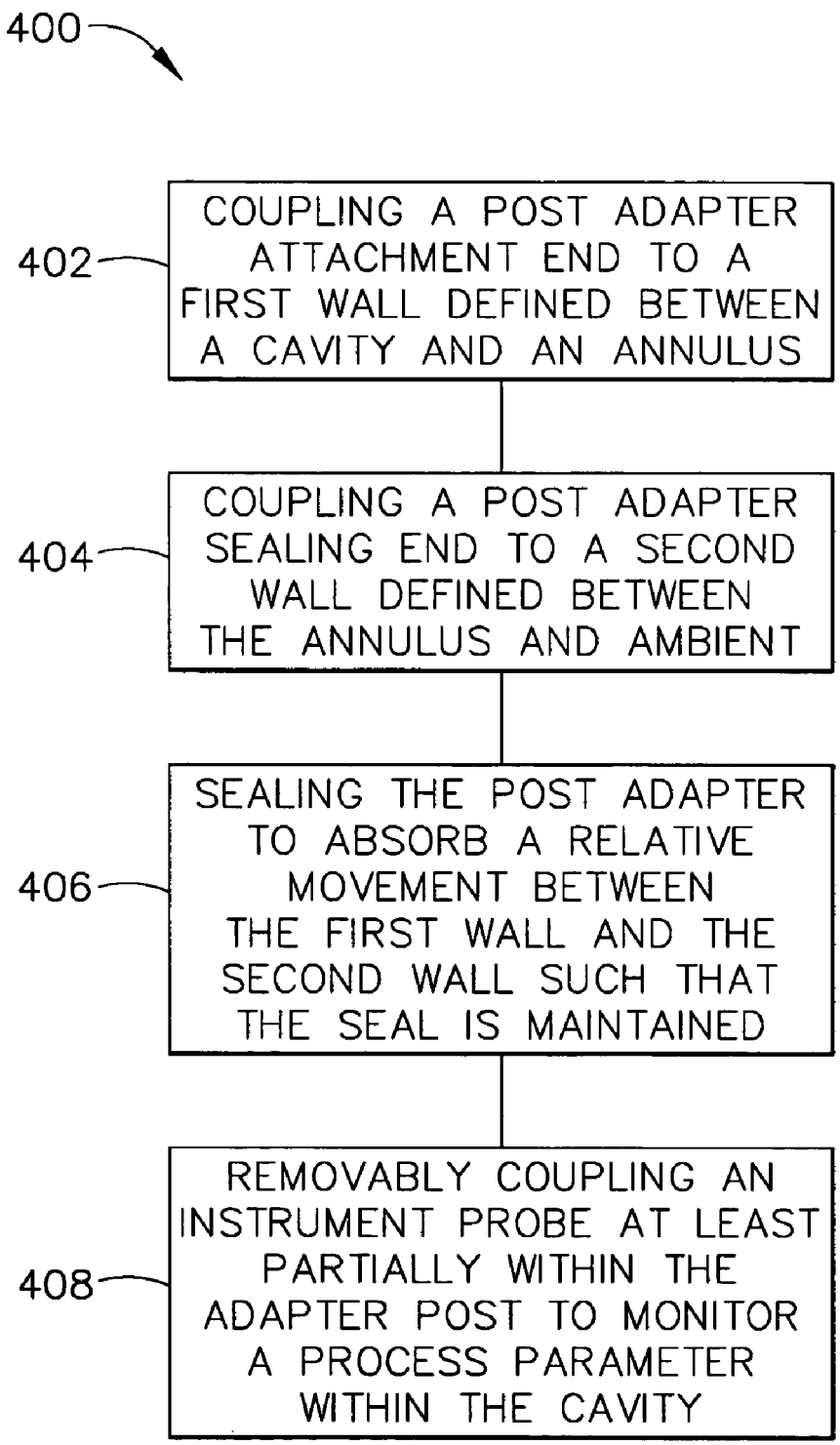
FIG. 4 is a flow diagram of an exemplary method that may be used with the instrument probe mounting assembly shown in FIG. 3.

FIG. 4 is a flow diagram of an exemplary method 400 that may be used with instrument probe mounting assembly 80 (shown in FIG. 3). Method 400 includes coupling 402 the attachment end of an adapter post to a first wall that is defined between a cavity, which includes a process to be monitored using the instrument probe, and an annulus adjacent to and/or surrounding the cavity. A sealing end of the adapter post may be coupled 404 to a second wall defined between the annulus and the ambient area or another annulus. The adapter post may then be sealed 406 to absorb a relative movement between the first wall and the second wall such that the seal is maintained during all periods of relative movement. The instrument may be at least partially inserted into the adapter post and removably coupled therein to provide monitoring of the process within the cavity.

The above-described instrument probe assemblies provide a cost-effective and reliable means for monitoring a process. More specifically, each assembly includes a sealing arrangement positioned between components that may move relative to each other during process monitoring operations. The sealing arrangement facilitates maintaining a pressure barrier between a plurality of process streams and between process streams and the ambient area during periods of relative movement between components. As a result, a instrument probe assembly is provided that permits monitoring remote process parameters while maintaining sealing between those processes and the ambient area.

An exemplary embodiment of a instrument probe assembly is described above in detail. The instrument probe assembly components illustrated are not limited to the specific embodiments described herein, but rather, components of each instrument probe assembly may be utilized independently and separately from other components described herein. For example, the instrument probe assembly components described above may also be used in combination with other process instrument systems.

While the invention has been described in terms of various specific embodiments, those skilled in the art will recognize that the invention can be practiced with modification within the spirit and scope of the claims.

What is claimed is:

1. A method of mounting an instrument probe using an adapter post, said method comprising:
   providing a seal plate comprising an aperture sized to receive the adapter post therethrough, a first face, and a second opposing face, the first face and the second face each define a seal groove that substantially circumscribes the aperture, and wherein the first face seal groove is configured to receive at least a portion of at least one compression seal ring;
   coupling an attachment end of the adapter post to a first wall defined between a cavity and an annulus; coupling an opposite sealing end of the adapter post to a second wall defined between the annulus and an ambient area such that the adapter post is inserted through the seal plate and such that the at least one compression seal ring is engaged by the second wall;
   sealing the adapter post to compensate for a relative movement between the first wall and the second wall such that a sealing arrangement absorbs axial and radial movement; and
   inserting the instrument probe at least partially within the adapter post to monitor a process parameter within the cavity.

2. A method in accordance with claim 1 wherein coupling a sealing end of the adapter post to a second wall comprises coupling the sealing end to the second wall using a piston-ring sealing arrangement.

3. A method in accordance with claim 1 wherein sealing the adapter post comprises sealing the adapter post between at least one of the cavity and annulus, the annulus and the ambient area, and the cavity and the ambient area.

4. A method in accordance with claim 1 wherein sealing the adapter post comprises sealing the adapter post between at least two of the cavity and annulus, the annulus and the ambient area, and the cavity and the ambient area.

5. A method in accordance with claim 1 wherein sealing the adapter post comprises sealing the adapter post between the cavity and annulus, between the annulus and the ambient area, and between the cavity and the ambient area.

6. A method in accordance with claim 1 wherein the instrument probe includes a damper, and wherein inserting the instrument probe at least partially within the adapter post comprises slidingly inserting the instrument probe at least partially within the adapter post to facilitate reducing radial motion of the instrument probe within the adapter post.

7. A method in accordance with claim 1 wherein coupling an attachment end of the adapter post to a first wall comprises securely coupling the attachment end to the first wall.

8. A method in accordance with claim 7 wherein coupling an attachment end of the adapter post to a first wall comprises threadably coupling the attachment end to a first wall.

9. A method in accordance with claim 1 wherein inserting the instrument probe at least partially within the adapter post comprises sealingly coupling the instrument probe at least partially within the adapter post.

10. A method in accordance with claim 9 wherein sealingly coupling the instrument probe at least partially within the adapter post comprises sealingly coupling the instrument probe to the second wall.

11. A method in accordance with claim 10 wherein sealingly coupling the instrument probe to the second wall comprises sealingly coupling the instrument probe using a compression-ring sealing arrangement.

12. A mounting assembly for mounting an instrument probe within a cavity, said mounting assembly comprising:
   an instrument probe comprising a probe head coupled to a probe sensor;
   an adapter post comprising an attachment end, a sealing end having a seal ring groove, and a hollow body extending therebetween, said body configured to receive said probe sensor at least partially therein;
   a seal plate comprising an aperture sized to receive said adapter post therethrough, a first face and a second opposing face, said first face and said second face each comprising a seal groove substantially circumscribing said aperture, said first face seal groove is configured to receive at least a portion of a compression seal ring that is positioned to engage a wall defining the cavity; and
   a sealing arrangement extending substantially circumferentially around said adapter post, said sealing arrangement configured to absorb axial and radial movement.

13. A mounting assembly in accordance with claim 12 wherein said adapter post sealing end further comprises a seal groove.

14. A mounting assembly in accordance with claim 12 wherein said seal ring groove is configured to receive at least a portion of a compression seal ring therein.

15. A mounting assembly in accordance with claim 12 wherein said attachment end is configured to couple to a first wall, said sealing end is configured to couple to a second wall that is spaced a distance from the first wall.

16. A mounting assembly in accordance with claim 15 wherein said probe head is configured to couple to the second wall.

17. A mounting assembly in accordance with claim 12 wherein said probe sensor comprises:
   an elongate body; and
   at least one damper configured to slidably engage a radially inner surface of said adapter post.

18. A mounting assembly in accordance with claim 17 wherein said at least one damper comprises a coil wire helically-wound around at least a portion of the body.

19. A mounting assembly for mounting a temperature probe to a gas turbine engine, said temperature probe mounting assembly comprising:
   a temperature probe comprising a probe head coupled to a probe sensor extending from said probe head, said probe sensor comprising an elongate body and a damper coil wire helically-wound around at least a portion of said body;
   an adapter post comprising an attachment end configured to couple to the gas turbine engine, a sealing end comprising a circumferential seal groove configured to receive a seal ring partially therein to facilitate sealing contact between said sealing end and a wall, and a hollow body extending between said sealing end and said seal ring, said body sized to receive at least a portion of said probe sensor therein;
   a seal plate comprising an aperture sized to receive said adapter post therethrough, a first face, and an opposing second face, said first face and said second face each comprising a circumferential seal groove circumscribing said aperture, said seal groove sized to receive at least a portion of a compression seal ring therein, said compression seal ring engaged by a wall of a fan casing positioned radially outwardly from the gas turbine engine; and
   a sealing arrangement extending substantially circumferentially around said adapter post, said sealing arrangement configured to absorb axial and radial movement.

* * * * *